United States Patent [19]

Guarnacci

[11] 4,205,486
[45] Jun. 3, 1980

[54] SASH STRUCTURE FORMED BY SECTIONS AND SQUARE CONNECTION ELEMENTS

[75] Inventor: Emilio Guarnacci, Florence, Italy

[73] Assignee: 1P Industria Chimica Per l'Arredamento S.P.A., Rome, Italy

[21] Appl. No.: 885,898

[22] Filed: Mar. 13, 1978

[30] Foreign Application Priority Data

Mar. 15, 1977 [IT] Italy ................................. 9371 A/77

[51] Int. Cl.² ............................................... E06B 3/00
[52] U.S. Cl. ........................................ 49/501; 49/504; 403/231; 403/295; 403/403
[58] Field of Search ......................... 49/501, 503, 504; 403/231, 232.1, 295, 403

[56] References Cited

U.S. PATENT DOCUMENTS

| 2,835,325 | 5/1958 | Gilbert et al. | 49/501 X |
| 3,342,514 | 9/1967 | Ivanhoe et al. | 49/501 X |
| 3,533,190 | 10/1970 | Hilfinger et al. | 49/501 |
| 4,027,987 | 6/1977 | Berkowitz | 403/295 X |

FOREIGN PATENT DOCUMENTS 2122257 12/1971 Fed. Rep. of Germany ............. 49/501

Primary Examiner—Philip C. Kannan
Attorney, Agent, or Firm—Haseltine, Lake & Waters

[57] ABSTRACT

A sash structure, formed of angular connection elements which are engaged to the sides of a frame and to which designated components are integrally formed for the functionality of the sashes. Such components as hinges, guide selvages of closure latches and the like are included in the frame structure. The connection elements are formed by the angle or corner of the branches inserted in concurrent sections. Extension portions are employed follow the shape of the sections to complete the corner and combine with the balance of the structure.

5 Claims, 34 Drawing Figures

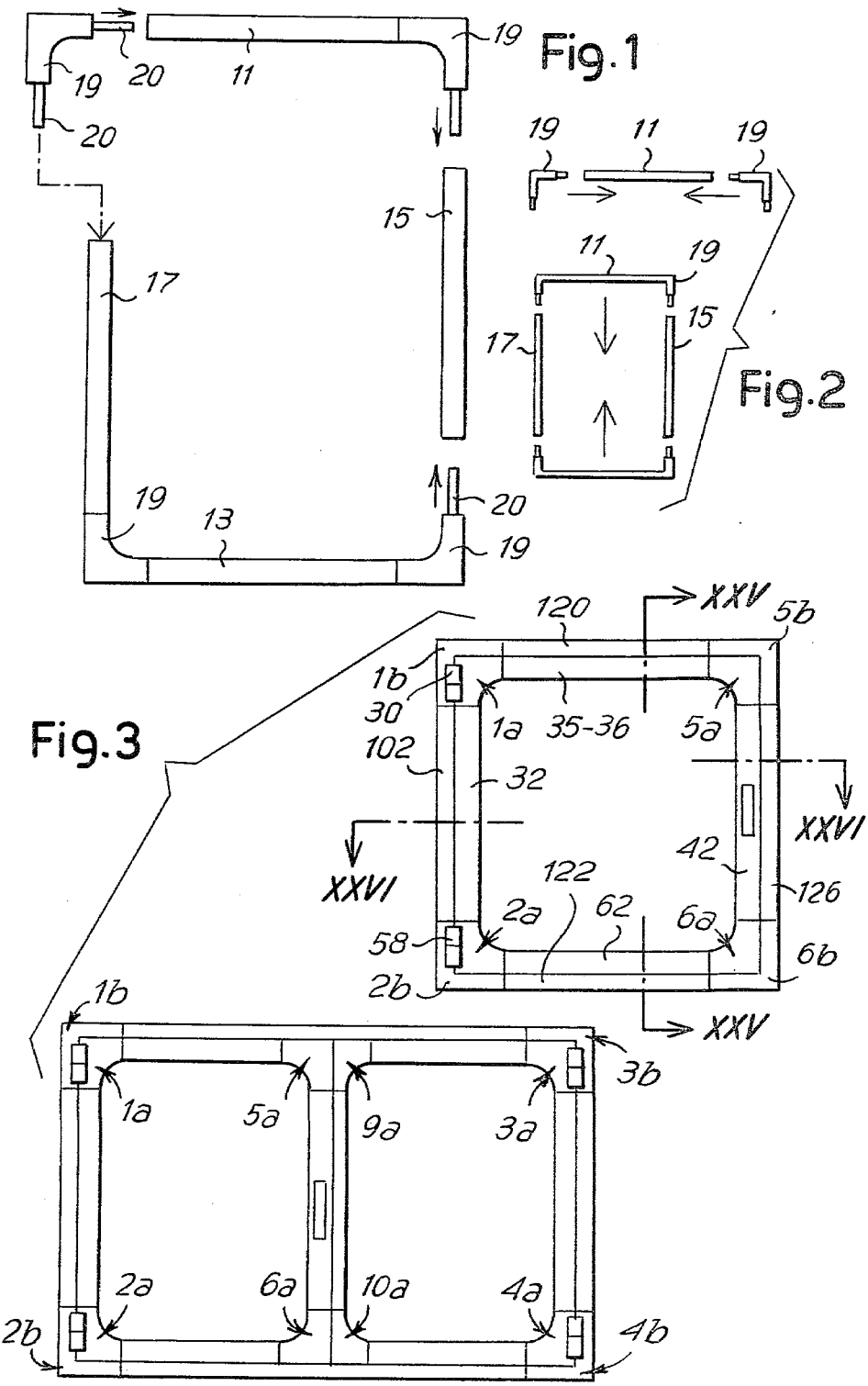

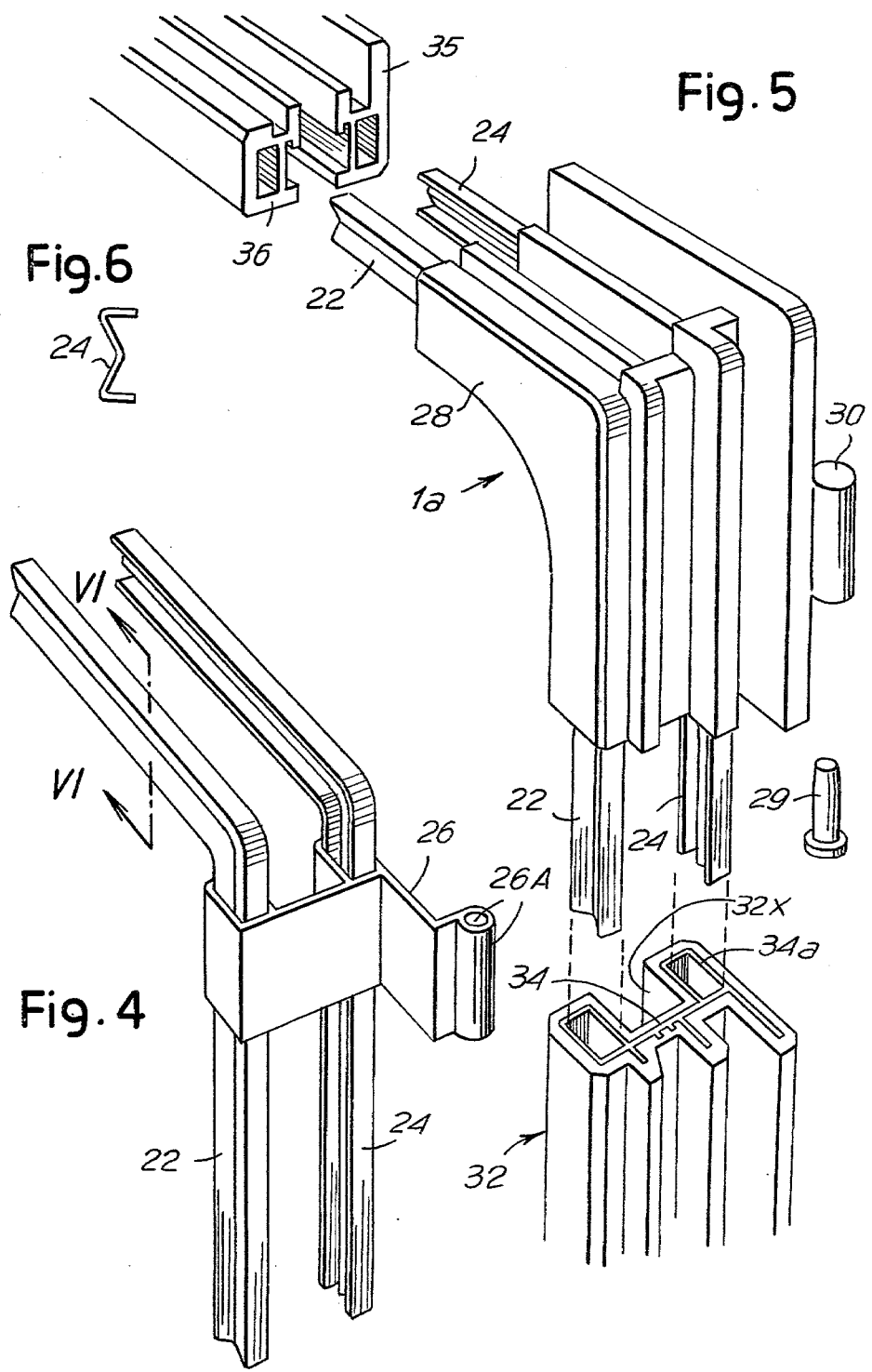

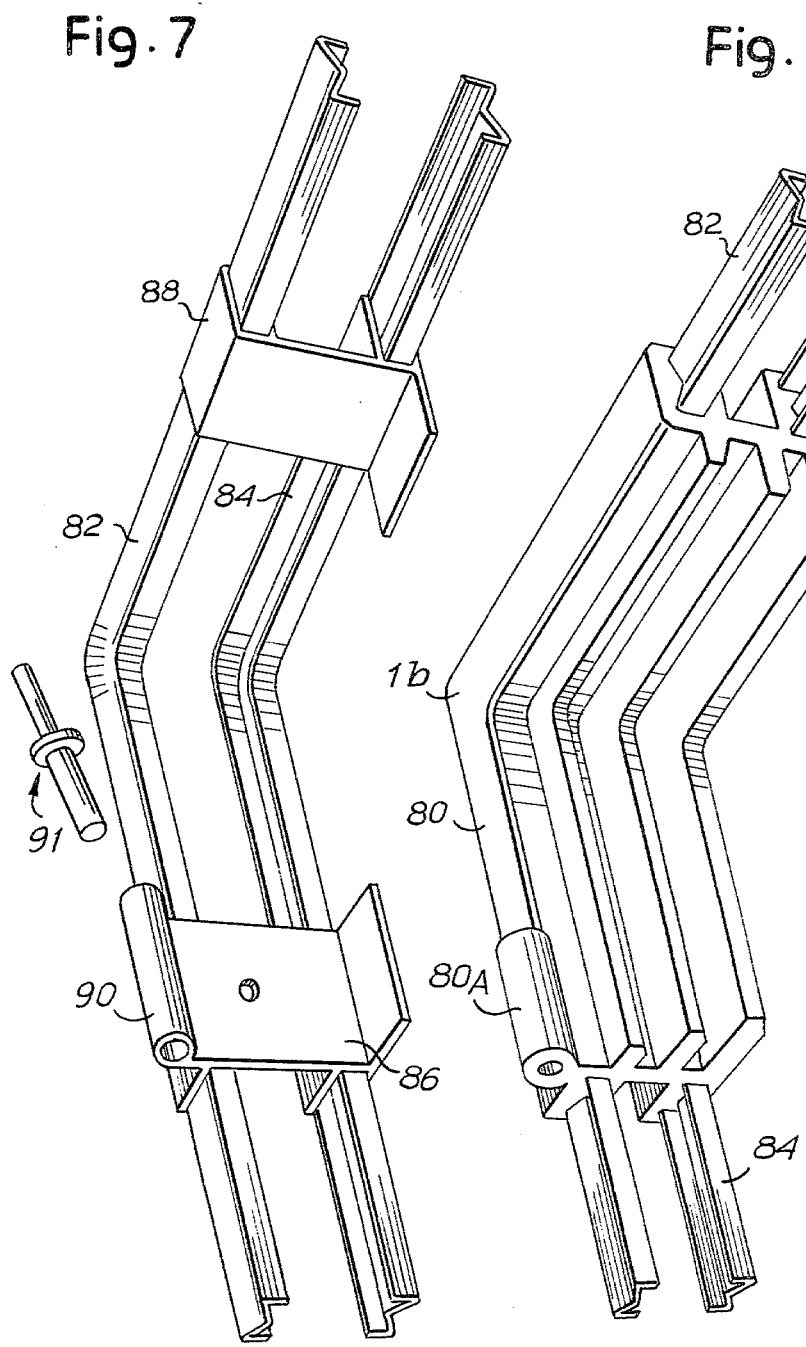

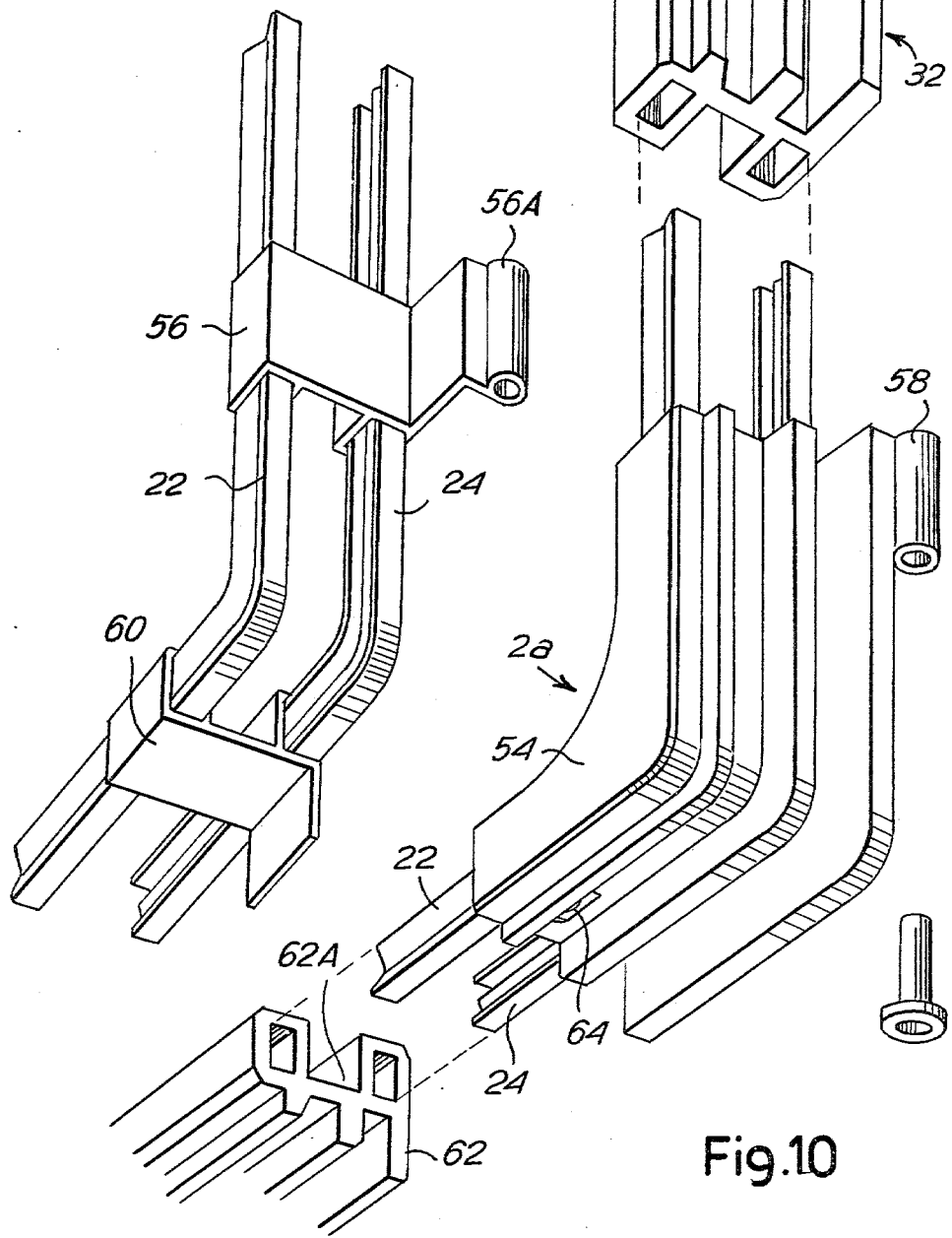

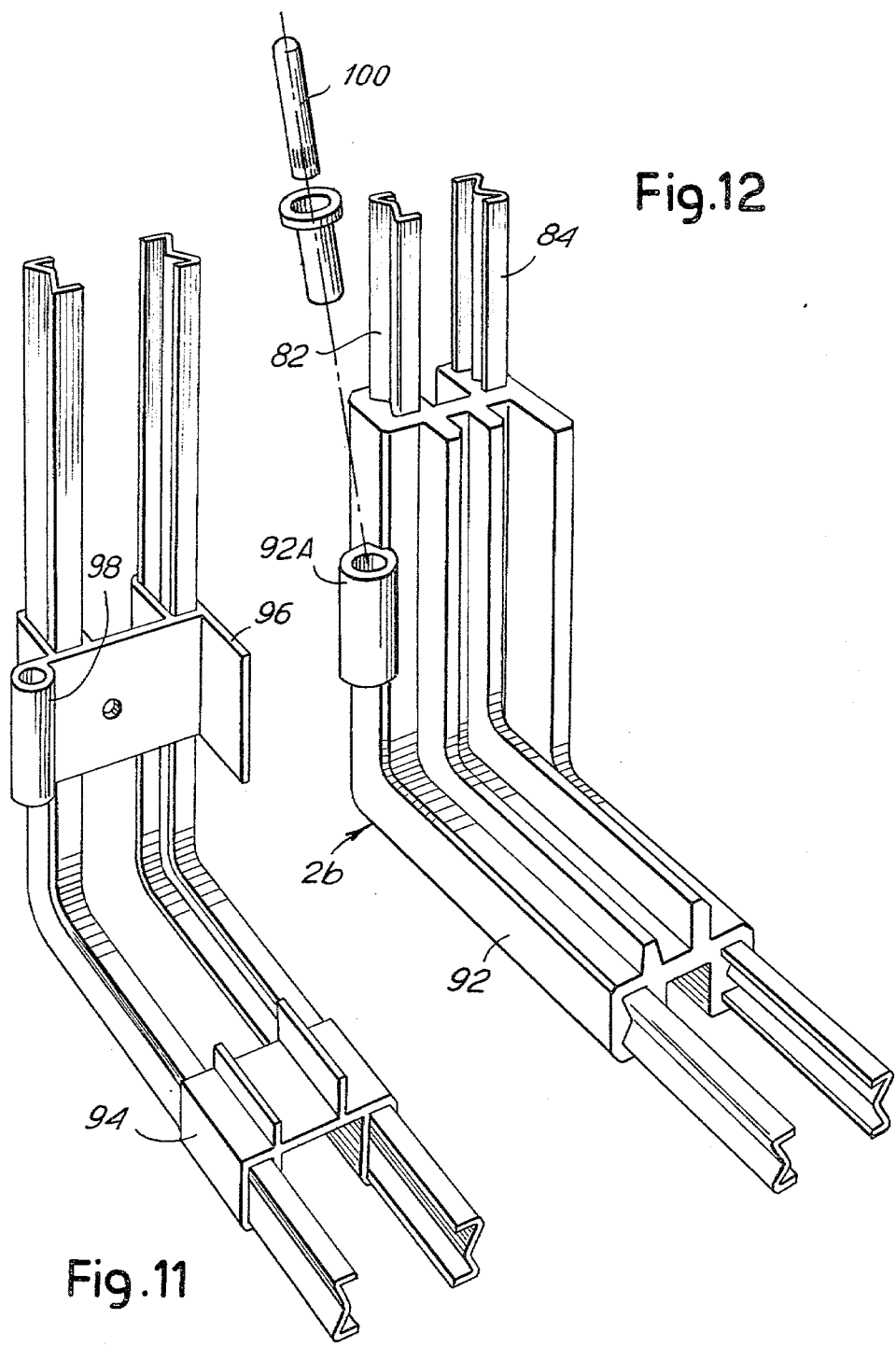

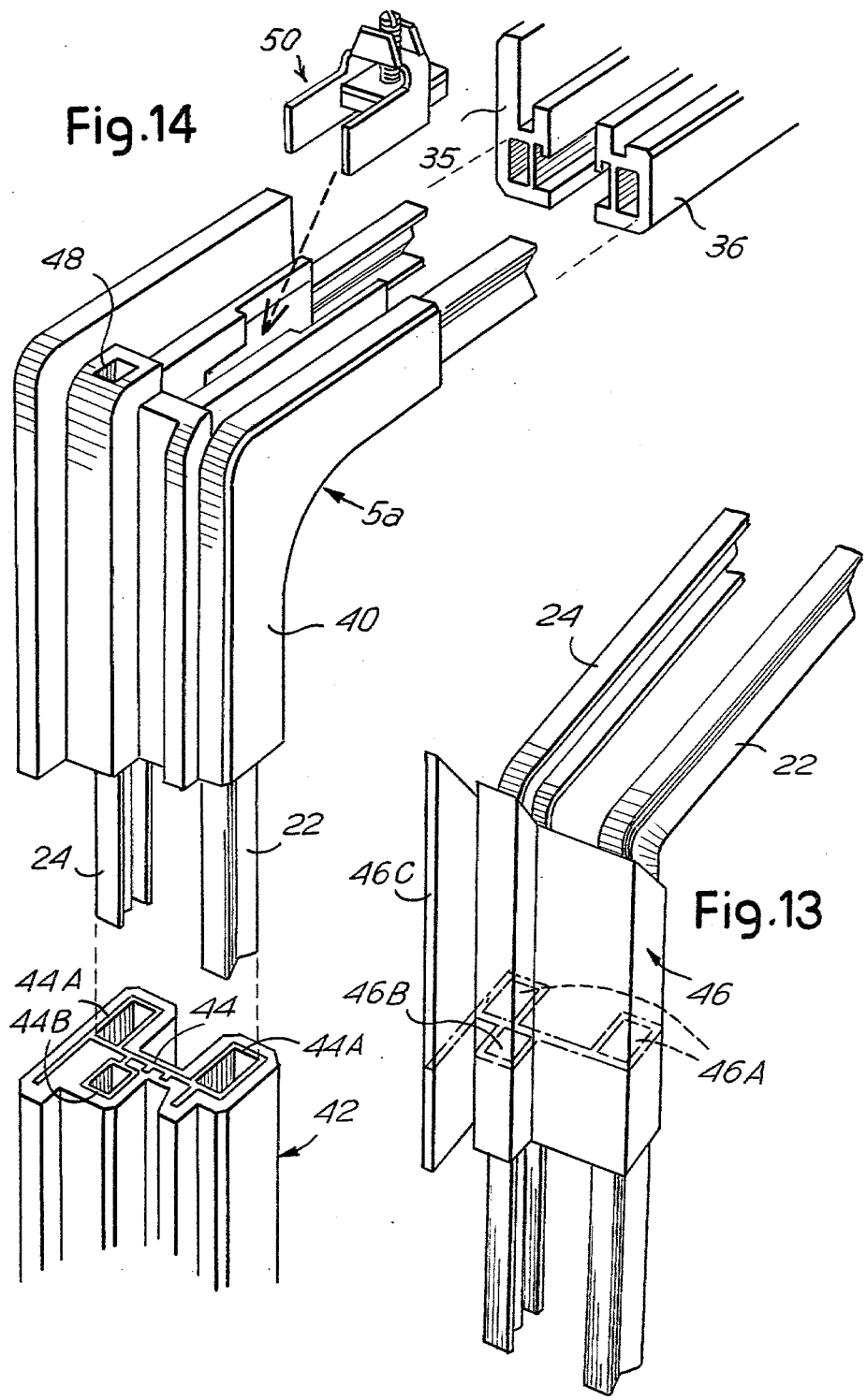

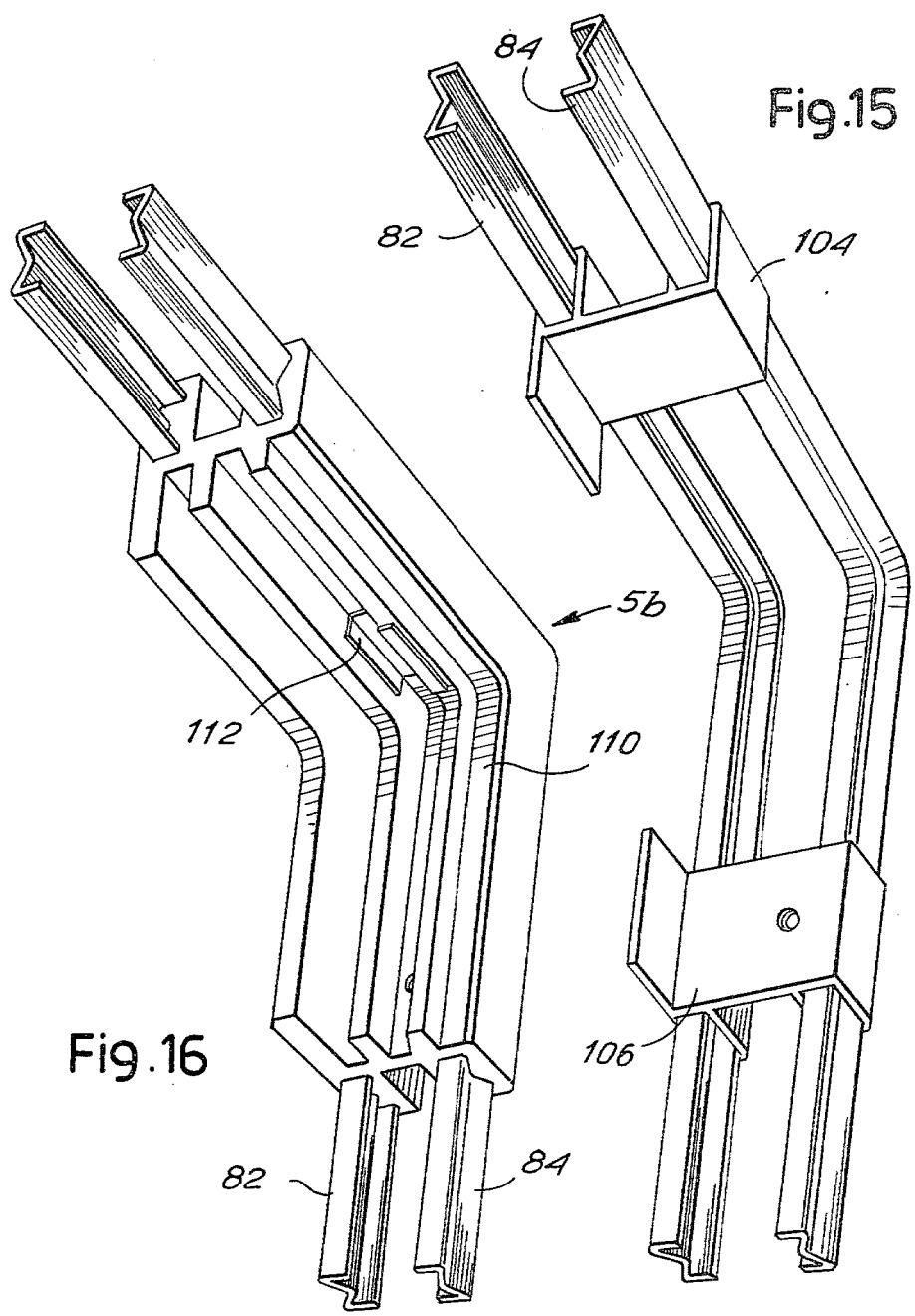

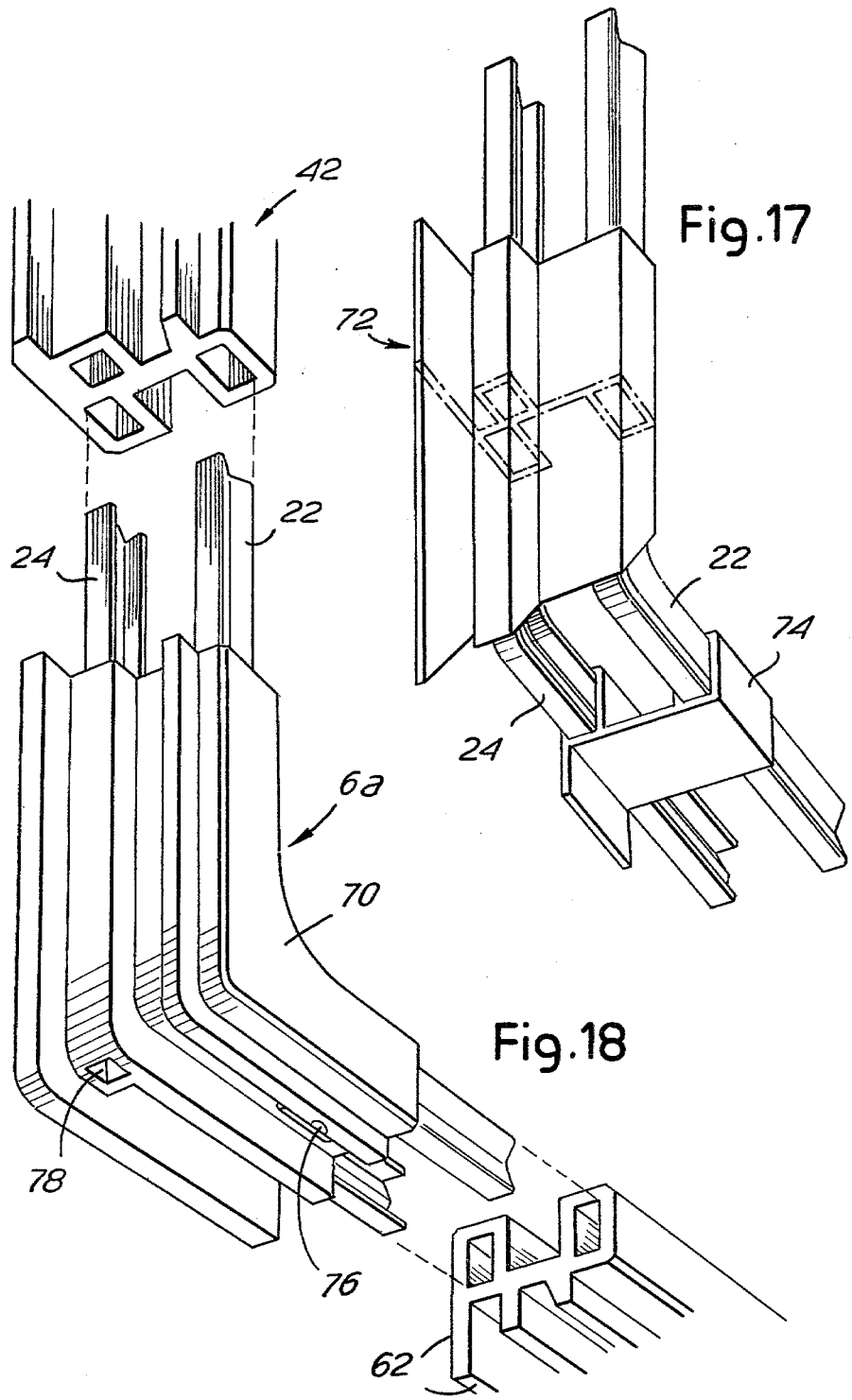

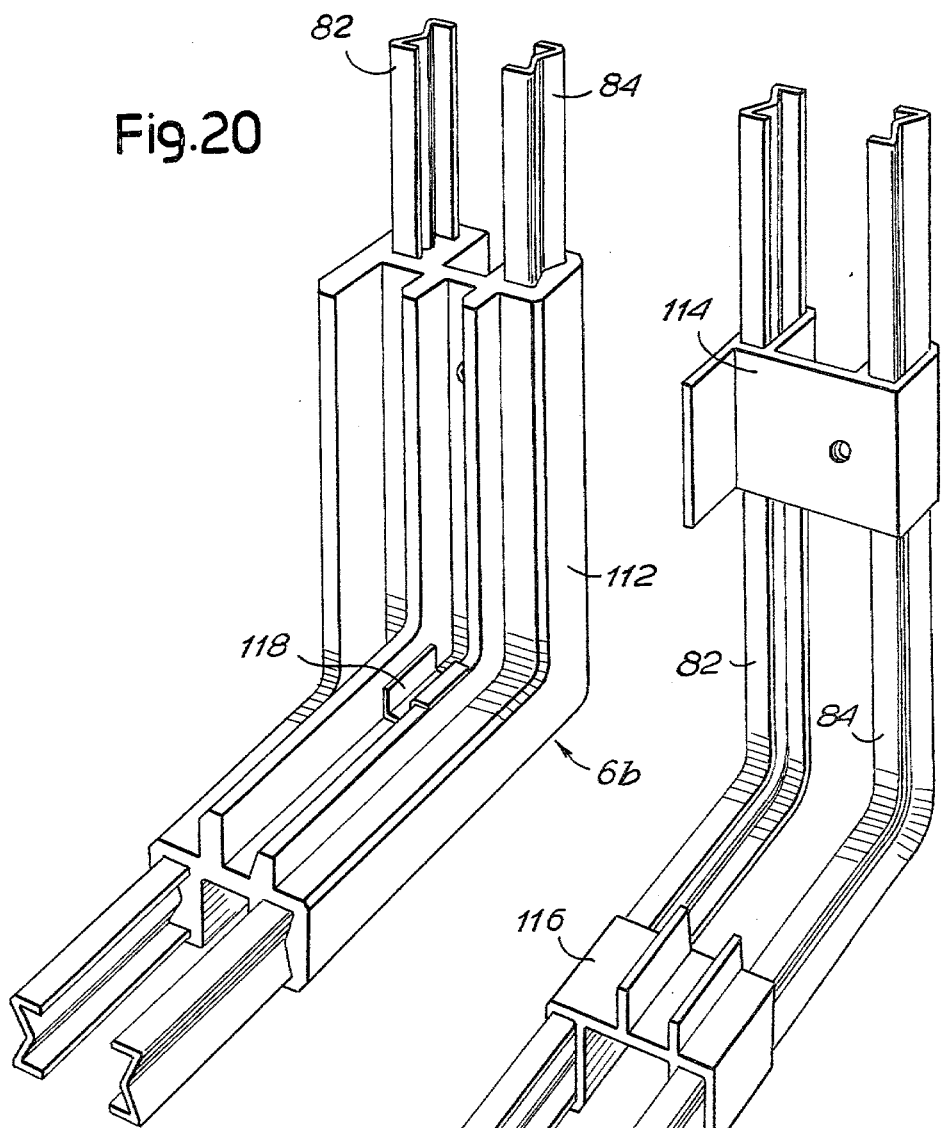

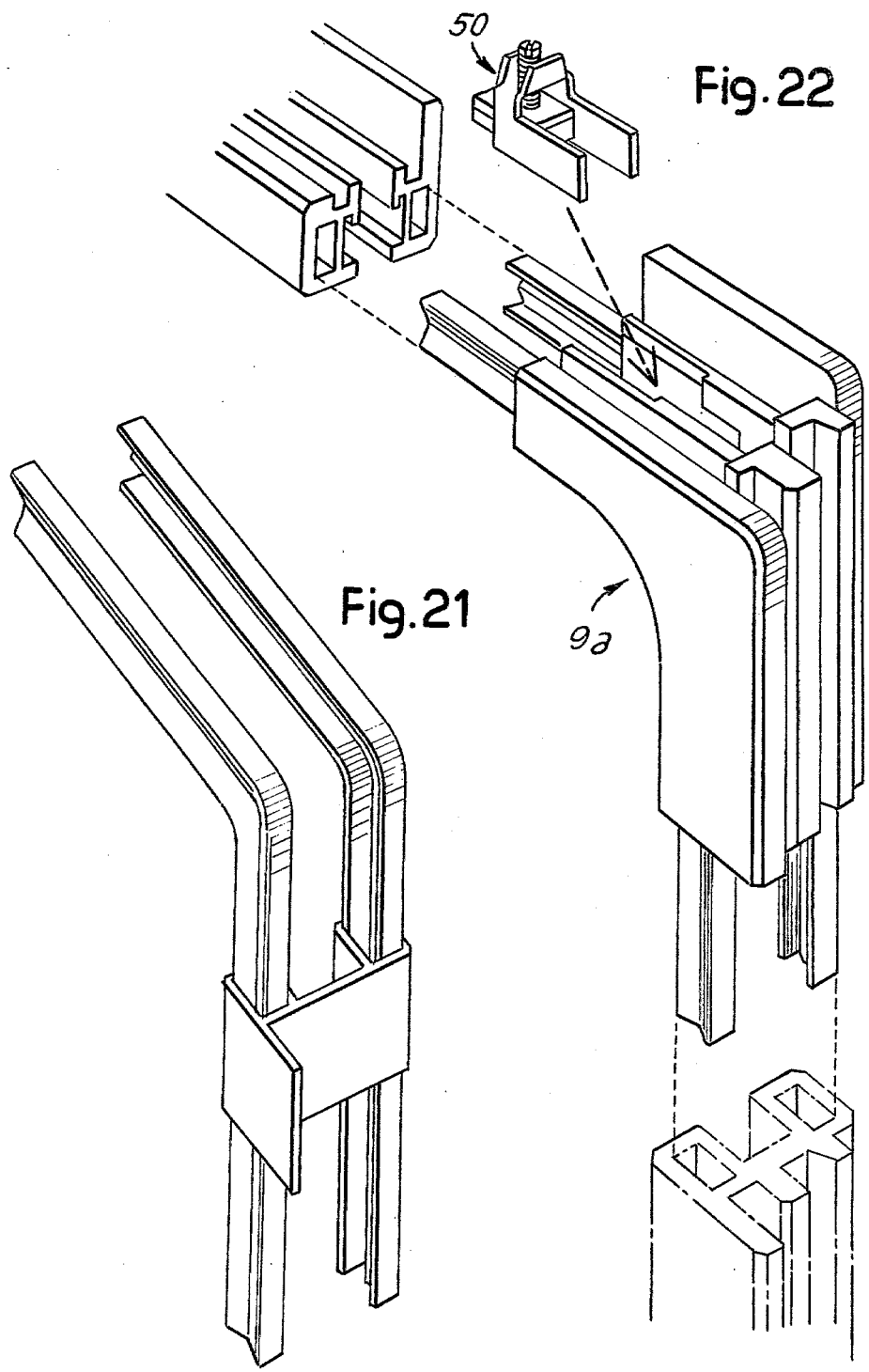

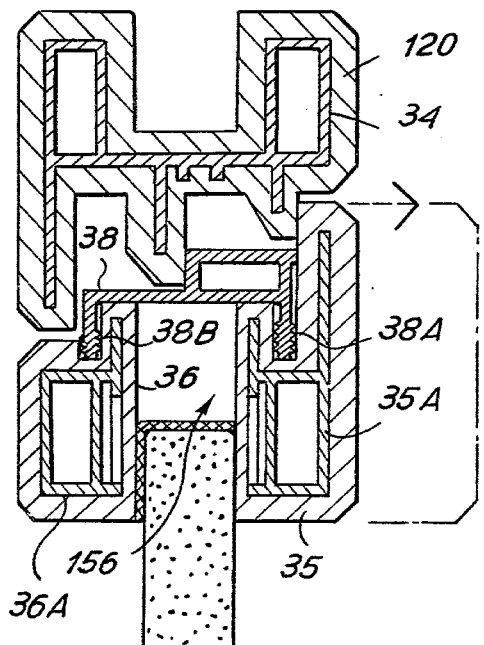
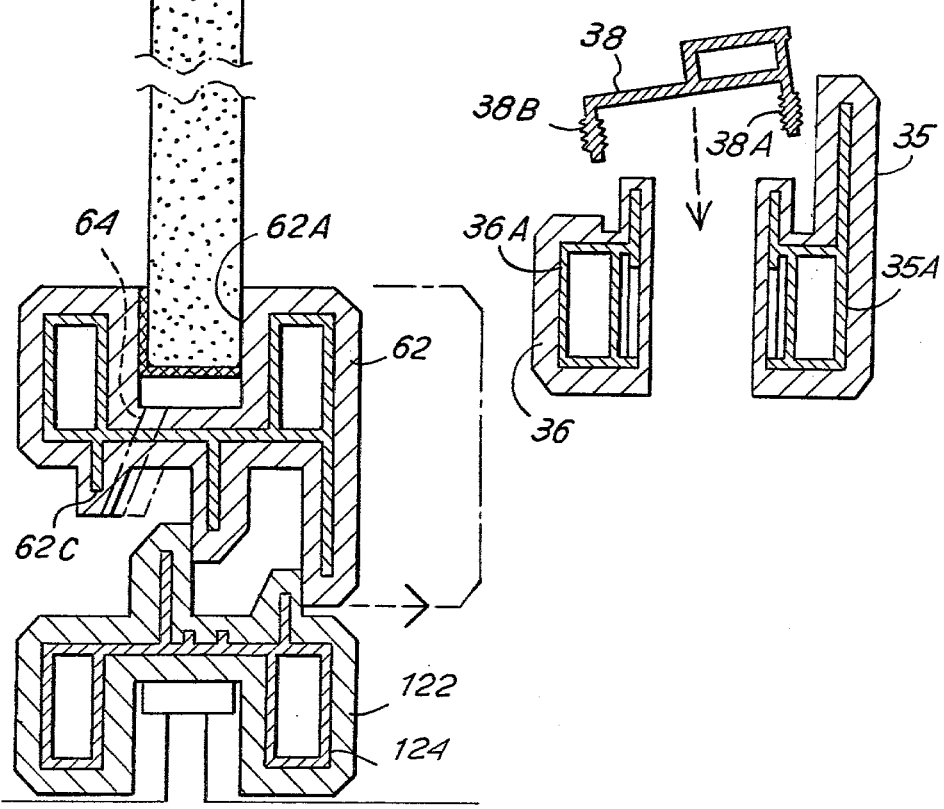
Fig. 25
Fig. 25A

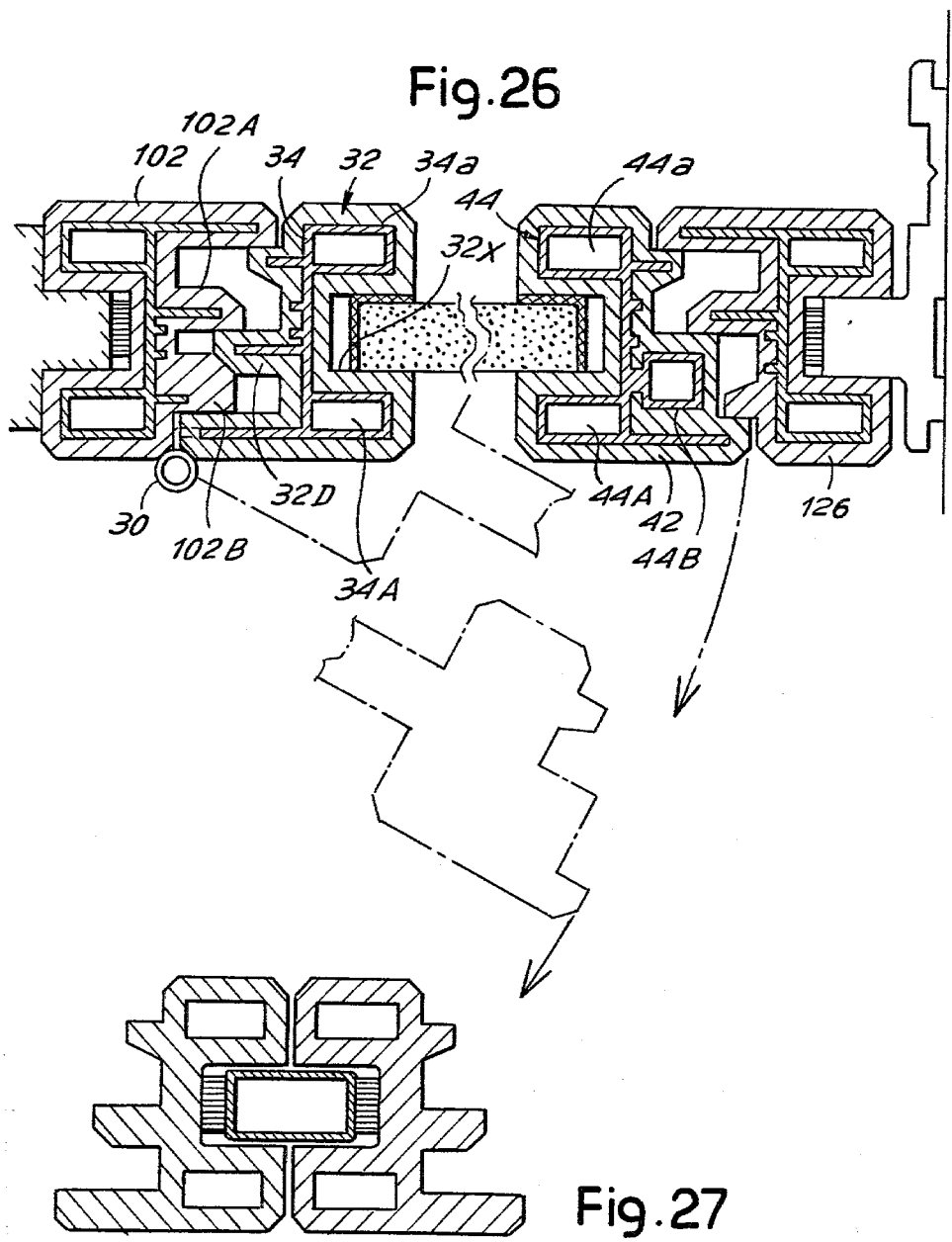

SASH STRUCTURE FORMED BY SECTIONS AND SQUARE CONNECTION ELEMENTS

BACKGROUND OF THE INVENTION

The invention relates to an improvement in sash structures consisting of a stationary part and of one or two movable parts, formed by hollow sections and by angular connection elements for said sections.

In these known arrangements, a movable wing is borne by hinges applied along the section which is located on a linkage side, the hinges in turn being applied to a section of the corresponding upright of the stationary frame, which may also be formed with the aforementioned system. (Other applications are also provided on the sections.) The aforementioned necessitates use of working on the sections, which must be above all relatively very exact. In addition, the strains which are transmitted through the components applied to the sections—such as the hinges—load such sections and therefore the sections must be correspondingly strong.

DISCUSSION OF THE INVENTION

The main object of the invention is to avoid the disadvantages of the prior art.

Still another object is to allow simple working, relative lightness of the sections and a reduction of strains concentrated in critical points of the inventive structure.

According to the invention angular connection elements are provided integral to the functional components intended for the sashes, including: hinges, guide selvages of closure latches and the like.

In an advantageous embodiment of the invention, said angular connection elements are provided—in correspondence of the angle formed by the branches inserted in the concurrent sections—with extension that follow the contour of said sections and complete it in the corner; the abovementioned components are combined to said extensions or expansions.

These angular extensions may be developed in such a manner as to form the end portions of the concurrent sides of the frame, re-assuming the contour of the sections and allow the transverse cutting thereof, i.e. at 90°, rather than at 45°. Alternatively, these extensions or expansions may be developed like a plate in bisecting the place of an angle formed by the concurrent sections and which are in this case cut at 45°.

In one embodiment, outer bushes forming hinges are integral to said extensions or expansions. In another embodiment, windows are cut in said plate extensions forming guide selvages for latches, of a cremone bolt type or the like.

In a structure with an outer stationary frame and movable frame or frames, hinged thereto, the angular connection elements corresponding to one another in the outer frame and in the movable one, advantageously have the extensions developed in such a manner, whereby the end surfaces thereof are substantially coplanar; therefore, the sections of all the sides or at least of the vertical ones are similar in the outer frame and in the movable frame. This facilitates the working and avoids mistakes in the sizing.

The connection elements may advantageously present pairs of flanked square members, which are made integral through extensions or are made in one piece with extensions or with connections stirrups. The square members may present, in the respective branches, broken cross-sections or longitudinal slots, to obtain a certain extent or resilient yield corresponding to forcing projection teeth in the section.

The invention will be better understood following the description and the accompanying drawing which illustrates an embodiment not restricting the invention.

IN THE DRAWING

FIGS. 1 and 2 illustrate a typical assembly of a sash or frame according to the invention;

FIG. 3 illustrates the components of the stationary frame and of the movable frame respectively of the movable frames of a sash having a wing and of a sash having two or more movable wings;

FIGS. 4 and 5 illustrate components and details relating to the angle denoted by 1a in FIG. 3;

FIG. 6 is a local section taken along the line VI—VI of FIG. 4;

FIGS. 7 and 8 illustrate the details of an angle or corner of the stationary frame denoted by 1b in FIG. 3;

FIGS. 9 and 10 illustrate details of an angle denoted by 2a in FIG. 3;

FIGS. 11 and 12 illustrate details of an angle or corner indicated by 2b in FIG. 3 and relating to the stationary frame;

FIGS. 13 and 14 show the components of an angle or corner indicated by 5a in FIG. 3, relating to a movable wing;

FIGS. 15 and 16 illustrate a detail of an angle or corner indicated by 5b relating to the stationary wing;

FIGS. 17 and 18 illustrate in a similar fashion a detail indicated by 6a in FIG. 3 relating to the stationary frame;

FIGS. 19 and 20 illustrate details, relating to the angle or corner indicated by 6b in FIG. 3, of the stationary frame;

Figure 28:
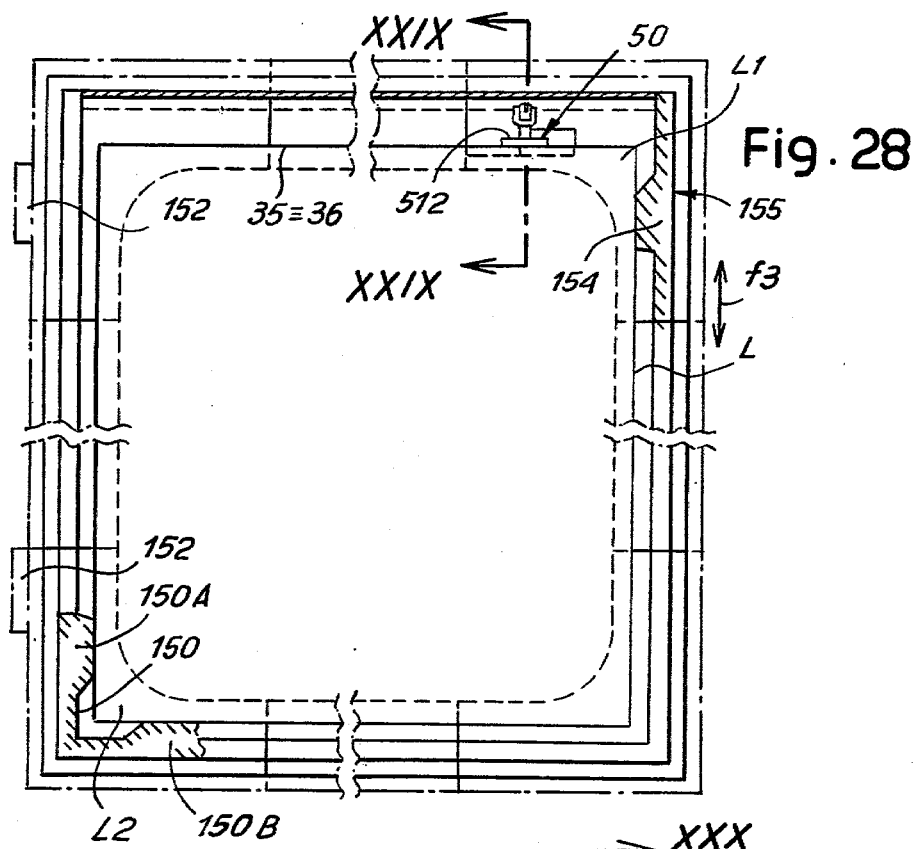
Figure 29:
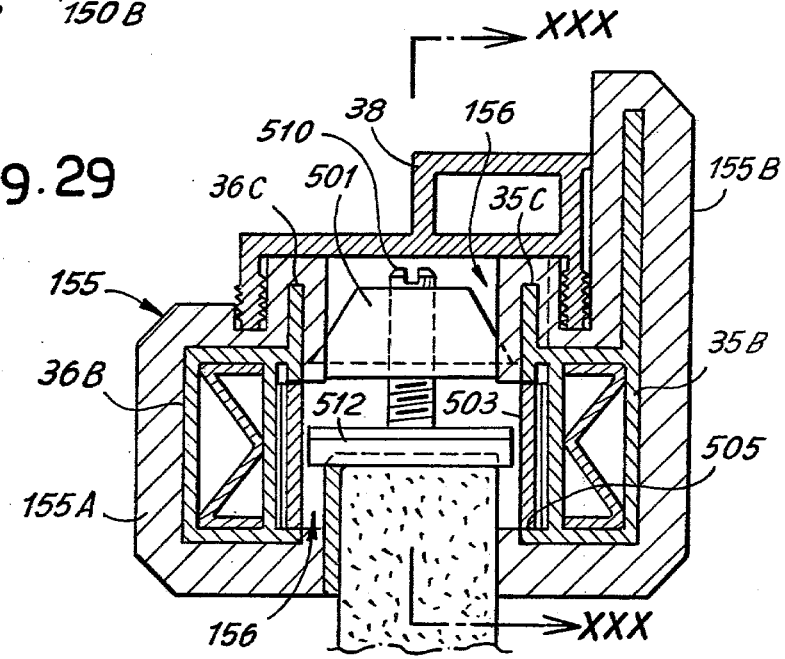
Figure 30:
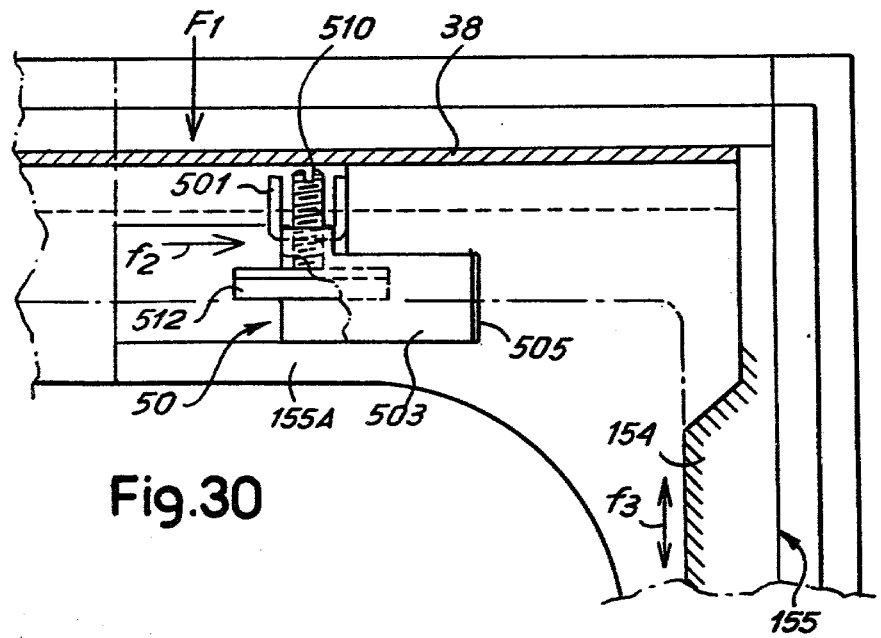
Figures 31, 32:
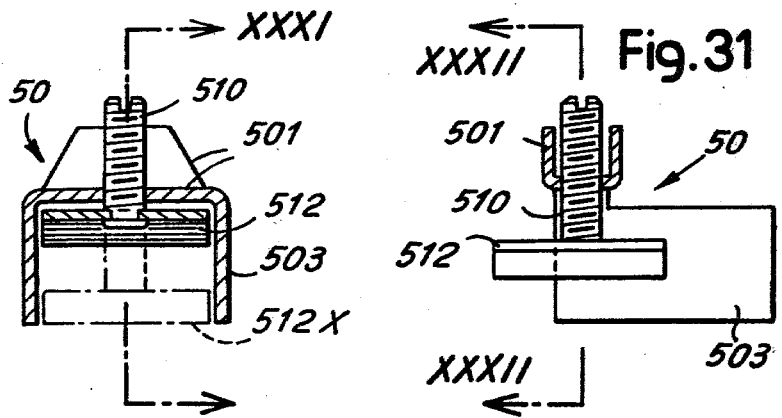
Figure 33:
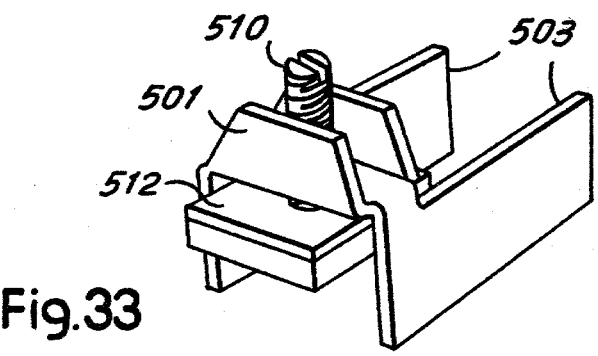

FIGS. 21 and 22 and respectively 23 and 24 show details relating to the angles indicated by 9a and 10a in FIG. 3 and relating to the angles or corners of the movable wing which are coupled to a corresponding movable wing having the details indicated by 5a and 6a relating to the angle already described in FIGS. 13, 14 and 17, 18;

FIGS. 25, 25A and 26 illustrate a vertical section taken along the line XXV—XXV of FIG. 3, a detail thereof with decomposed elements, and a section taken along the line XXVI—XXVI of FIG. 3;

FIG. 27 illustrates a detail relating to the fastening between contiguous unit components;

FIG. 28 illustrates a movable wing with the glass pane in order to show a detail relating to the cooperation between the frame of the movable wing and the pane;

FIGS. 29 and 30 illustrate an enlarged local section taken along the line XXIX—XXIX of FIG. 28 and a section taken along the line XXX—XXX of FIG. 29, showing an enlarged detail of FIG. 28;

FIGS. 31, 32 and 33 illustrate a setting or adjustment device for the cooperation between the frame of the movable wing and the pane; respectively in the sections taken along the line XXXI—XXXI of FIG. 32, XXXII—XXXII of FIG. 31 and in the perspective view.

DETAILED EXPLANATION OF THE INVENTION

According to the accompanying drawings, and with an initial reference to FIGS. 1 and 2, a rectangular frame is substantially formed according to the invention by sections 11, 13, 15 and 17, these latter forming uprights, which are connected with each other by means of angular elements 19 which may be variably shaped for coupling requirements between stationary frames and movable frames. The angular elements being provided with cores having extensions 20 which are inserted in the longitudinal cavities of the sections forming the sides 11, 13, 15 and 17 in order to assure coupling or matching; these sections 11, 13, 15 and 17 are made of synthetic resin with metal reinforcement and are obtained by transversal cutting from sections of a greater extension or length. As is particularly seen in FIG. 2, firstly one provides for the coupling between one of the sections, for instance the section 11 and two of the angular elements 19 contiguous thereto, and this is repeated possibly also for the section 13, and then the units 19, 11, 19, respectively 19, 13, 19 are coupled with the uprights 15 and 17.

The angular components 19 are made to respectively form and then incorporate the elements required for the functionality of the sash, and in particular include hinges, selvages and the like, in such a manner whereby the sections 11, 13, 15 and 17 have no particular necessity of being worked if not in a minimum amount. The strains which are imposed onto the movable frame through the hinges are not imparted onto the uprights or onto the sides obtained from the section, but are directly discharged onto the angular elements, avoiding the above complained disadvantages.

FIG. 3 illustrates an overall view of the assembly of a sash with a single wing and of another one with two wings to show the component elements which are better shown in the subsequent figures.

FIGS. 4, 5 and 6 illustrate a detail indicated by 1a in FIG. 3 and which is typical of an embodiment of the angular components according to the invention. Two metal elements 22 and 24 are denoted which are rigid and square, shaped as better shown in FIG. 6 and which form the extension as generically denoted at 20 in the preceding figures. These two metal square elements 22 and 24 are connected with each other both by a metal built-in element 26 and by a moulded synthetic resin body 28, shaped to re-assume the contour of the contiguous sections to the angular element 1a and formed by the uprights of different types are hereinafter better indicated. The built-in element 26 shaped as a metal stirrup, forms the housing 26A for a hinge, in particular for a pin which is borne by the corresponding angular component of the stationary wing. A bushing 29 is inserted in the housing 26A to form the bearing and the metal housing for the pin. The shaped body 28 which is moulded by injection on the reinforcement unit shown alone in FIG. 4, presents the rabbets or stops; the contour for the cooperation with the stationary wing, additionally forms a lining 30 for the portion 26, 26A. The body 28 terminates transversally to the development of the arms of the small square elements 22, 24 in such a manner that the latter project in pairs from the end terminating transversally thereto of the body 28.

The ends of small squares 22, 24 which are developed vertically in a sash are intended to cooperate with a section 32 which is also particularly shown in FIG. 26 and which has—as clearly seen in this figure—a metal reinforcement 34 with laminar extensions developing in correspondence of the edge projecting parts of the section 32. The reinforcement 34 also has in particular two portions with annular sections 34A and thus with a hollow profile, in which the extensions 22 and 24 are forcibly inserted in order to assure the connection between the angular element 1a and the upright 32. The transverse end of the body 28 corresponds to the cross-section of the section 32. The cross-section of the square elements 22 and 24 is particularly shown in FIG. 6, where it is seen that these sections may be inserted into the cavities 34A by force and without the need of a transversal locking.

In FIGS. 4 and 5 and also in FIGS. 25 and 25A there is shown the coupling of the upper angular element 1a with sections 35 and 36 which are intended to form a slot for the insertion of the glass pane. The glass pane is inserted in channels or grooves of the uprights, such as the 32X formed by the section 32. The slot which is defined by the sections 35 and 36, is also extended in a portion of the body 28. According to FIGS. 25 and 25A section 38 is forcibly inserted into channels formed by the sections 35 and 36 with extensions 38A and 38B, in order to thus establish the connection between the two sections 35 and 36 and restore the rabbets or stops with the sections of the stationary frame, as it occurs in the sections of the other sides of the movable wing to cooperate with the corresponding sections of the stationary wing.

An angular element 5a is shown in FIGS. 13 and 14 which is opposite the one denoted by 1a and which cooperates with sections 35 and 36. The components 5a has two small square elements 22 and 24 as the previous ones and a moulded synthetic resin body 40, which defines the angular portion from which the square ends 22, 24 project; the squares project from transverse profiles which correspond to the transverse profiles of the respective uprights, in particular of an upright 42 similar to that 32 but designed to form the movable outer rabbet of a movable wing. The section 42 has a reinforcement 44 which corresponds to 34 with the through cavities 44A intended to allow the penetration of the extensions of the small squares 22 and 24. The section 44 also presents a through cavity 44B which is designed to form a housing for a latch of the cremone bolt type or the like, that can be incorporated in the same section. The metal section 44 like the section 34 is incorporated in the synthetic resin of the plastic section, as it is shown clearly in the drawing. In the body 40 a metal built-in portion 46 is inserted, consisting of a length of a section equal or at least similar to the one 44, in order to form in the interior of the body 40 (see FIG. 13). A housing 46B corresponding and similar to the one 44B accommodates the rod of the cremone bolt, besides housings 46A for the squares 22 and 24. The portion 46 may include a reinforcement wing 46C. In the moulding of the body 40, there is also formed a selvage 48 corresponding to the cavity 46B for the outlet of the cremone bolt rod intended to cooperate with a selvage which will be provided—as hereinafter indicated—in the corresponding angular portion of the stationary frame. The body 40 is shaped to obtain the housing for a built-in piece 50 designed to cooperate with the glass pane inserted in the movable wing, for the described purposed hereinafter. The piece 50 being better described with reference to FIGS. 28 to 33, and also with reference to FIG. 25 which shows the sections 35, 36; these sections are also set up with reinforcements generically indicated by 35A and 36A, that can receive the ends of the squares 22 and 24.

FIGS. 9 and 10 illustrate the angular component 2a which is similar to the one 1a particularly indicated in FIGS. 4 and 6, and thus includes, as above, the metal section squares 22 and 24, which project from a synthetic resin body 54 moulded thereon incorporating a stirrup 56 similar to the one 26 with a lateral extension to form the housing 56A for the hinge pin. The housing is enclosed by a synthetic resin portion 58 developed from the body 54 to protect and incorporate the housing for the hinge 56A. An additional stirrup 60 is incorporated in the body 54 to connect the two squares 22 and 24 with each other, together with the stirrup 56. The presence of the stirrup 60 in the embodiment of the angle or corner 2a is possible because this angle or corner (which is lower) does not require a slot housing for the insertion of the glass pane, and thus the connection is possible between the two squares 22 and 24 through this stirrup 60, without using connection means such as the section 38 which connects to each other the sections 35 and 36 of the upper side. Therefore, the lower side of the movable wing consists of a section 62, which is equal to the one 32 and which forms with its own channel 62A the lower housing for the glass pane. Corresponding to the channel 62A there is formed, by the body 54, an end channel portion and the latter characteristically has a discharge conduit 64 (also see FIG. 25) for the water which could otherwise pile up in the channel 62A. The discharge conduit 64 externally leads to the outside of the gutter which in the section 62 is indicated by 62C. The profile of the end cross-section of the body 54, in correspondence of the vertical projection of the squares 22, corresponds to the cross-section of the section 32 forming the connection upright between the angular element 1a already described and the element 2a being described. The stirrup 60 is developed to assure an appropriate strength to the inner rabbet or stop formed by the body 54 and is shaped to allow forming of the channel or groove for the pane corresponding to the channel 62A of the section 62. Also the stirrup 56, as the stirrup 26, is shaped to allow the forming of a vertical channel for the pane, in correspondence, of the channel or groove 32X of the section 32.

FIGS. 17 and 18 illustrate the angular component 6a which is the fourth of the angular components of the movable wing together with the components 1a, 2a and 5a, already described. The component 6a is substantially symmetrical to 5a already described in FIGS. 13 and 14, it includes in addition to the squares 22 and 24, a moulded body 70 thereon, and incorporates a built-in piece 72 similar to the one 46 of FIGS. 13 and 14 employed and for the corresponding purpose. In additin, the body 70 has a built-in piece formed by a stirrup 74 substantially equivalent to the one 60 of FIGS. 9 and 10 for an additional connection of the squares 22 and 24. The body 70 also has a discharge hole 76 similar to 64, besides a selvage 78 similar to the one 48 already shown in FIG. 14 for the lower outlet of the end of the cremone bolt for the engagement with a selvage provided in the angular element 6b.

After describing the above components of the movable wing 1a, 2a, 5a, 6a in the corner; uprights 32, 42; and transversal elements 62, 35, 36 the stationary frame will be described. The frame is being designed to cooperate with the single movable wing as stated above. This stationary frame includes angular components 1b, 2b, 5b and 6b to cooperate respectively with the angular components 1a, 2a, 5a and 6a and the sections similar to those of the movable wing. FIGS. 7 and 8 illustrate the angular component 1b, which includes a moulded body 80 in synthetic resin, forming the angle or corner of the stationary frame and incorporating squares 82 and 84 similar to those denoted by 22 and 24 of the angular components of the movable wing. Two stirrups 86 and 88 are incorporated in the moulded synthetic resin body 80 and connect the squares 82 and 84. The stirrup 86 forms an extension 90 to form a housing for the pin 91 of the hinge designed to cooperate with the hinge portion 26A, 29, 30 of the angular element 1a (see FIGS. 4 and 5); the body 80 forms a portion 80A which covers the housing 90 for the pin 91.

FIGS. 11 and 12 illustrate the angular element 2b of the stationary frame. Also this angular element includes a body 92 which is moulded to incorporate the squares 82, 84 similar to the already described ones for the body 1b, and stirrups 94. This latter forming a housing 98 for the pin 100 is similar to the one denoted by 91. The portion 98 of the stirrup 96 is enclosed by a portion 92A of the moulded body 92.

A shaped upright 102 is also clearly visible and shown in FIG. 26, to connect the two angular elements 1b and 2b. The bodies 80 and 92 which are respectively shaped at the faced ends as said section 102, to form the extension thereof. The ends of the squares 82, 84 are forced in the section 102 with the already described criterion for the sections of the frame of the movable wing. Section 102 with ribs 102A and 102B forms a fixing for a rib 32D of the section 32.

FIGS. 15 and 16 show an annular element 5b designed to cooperate with the one denoted by 5a and is substantially similar and symmetrical to the angular element 1b shown in FIGS. 7 and 8; in particularly, besides squares 82 and 84, it is provided with stirrups 104 and 106, substantially similar to 88 and 86 (apart the absence of the housing for the hinge). The whole being incorporated in a moulded synthetic resin body 110, in which a selvage 112 may be incorporated. The selvage being designed to cooperate with the end of the cremone bolt rod, which by the closure operation is caused to project from the selvage 48 of the body 40 (see FIG. 14).

FIGS. 19 and 20 show an angular element 6b which has a moulded synthetic resin body 112 incorporating the squares 82 and 84, as well as stirrups 114 (similar to that 106) and 116 (similar to that 94 of FIG. 11). A selvage 118 is incorporated in the body 112 to cooperate with the cremone bolt end which is caused to project from the selvage 78 (see FIG. 18) of the element 6a of the movable wing.

Section 120 (see FIGS. 3,) is coupled with the angular elements 1b and 5b, said section 120 being shaped like the one denoted by 32 and has a section 34 with through housings 34A for the squares 82 and 84 of the angular elements 1b and 5b. The angular elements 2b and 6b are combined with a horizontal section 122, which has a cross-section, as clearly shown in the lower portion of FIG. 25, and cooperates with the section 62 of the movable wing. Also this section 122 is reinforced with a metal section 124 with a through cavity for the squares 82 and 84. A section 102 (FIGS. 3 and 26) already described is arranged between the two angular elements 1b and 2b. A section 126 (FIGS. 3 and 26) cooperates between the two angular elements 5b and 6b, being similar to that 32 already described. The bodies of the angular elements of the stationary frame will therefore be shaped at the ends from which the ends of the squares 82 and 84 project, in such a manner as to correspond to the respective continuous sections, which are sheared from, semi-wrought materials formed by metal core and by synthetic resing lining. The lengths are sheared transversally and not at 45°, which simplifies indeed the working and minimizes waste.

Figure 23:
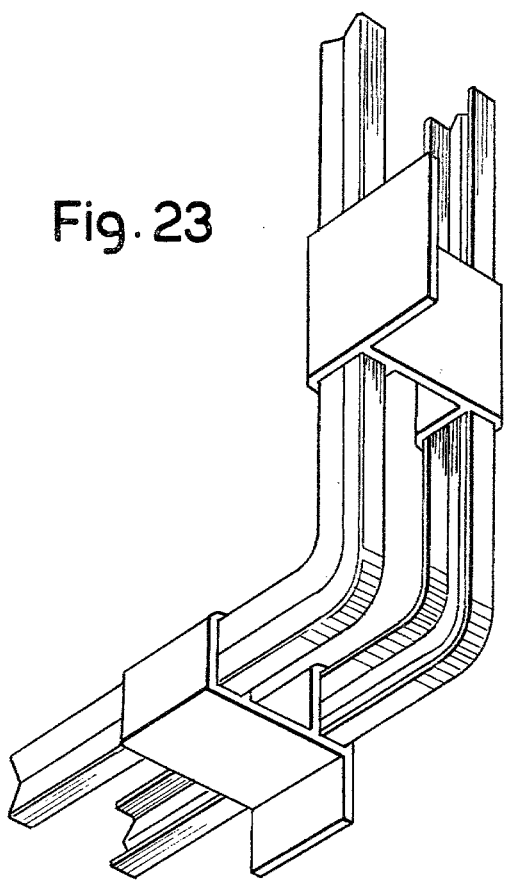
Figure 24:
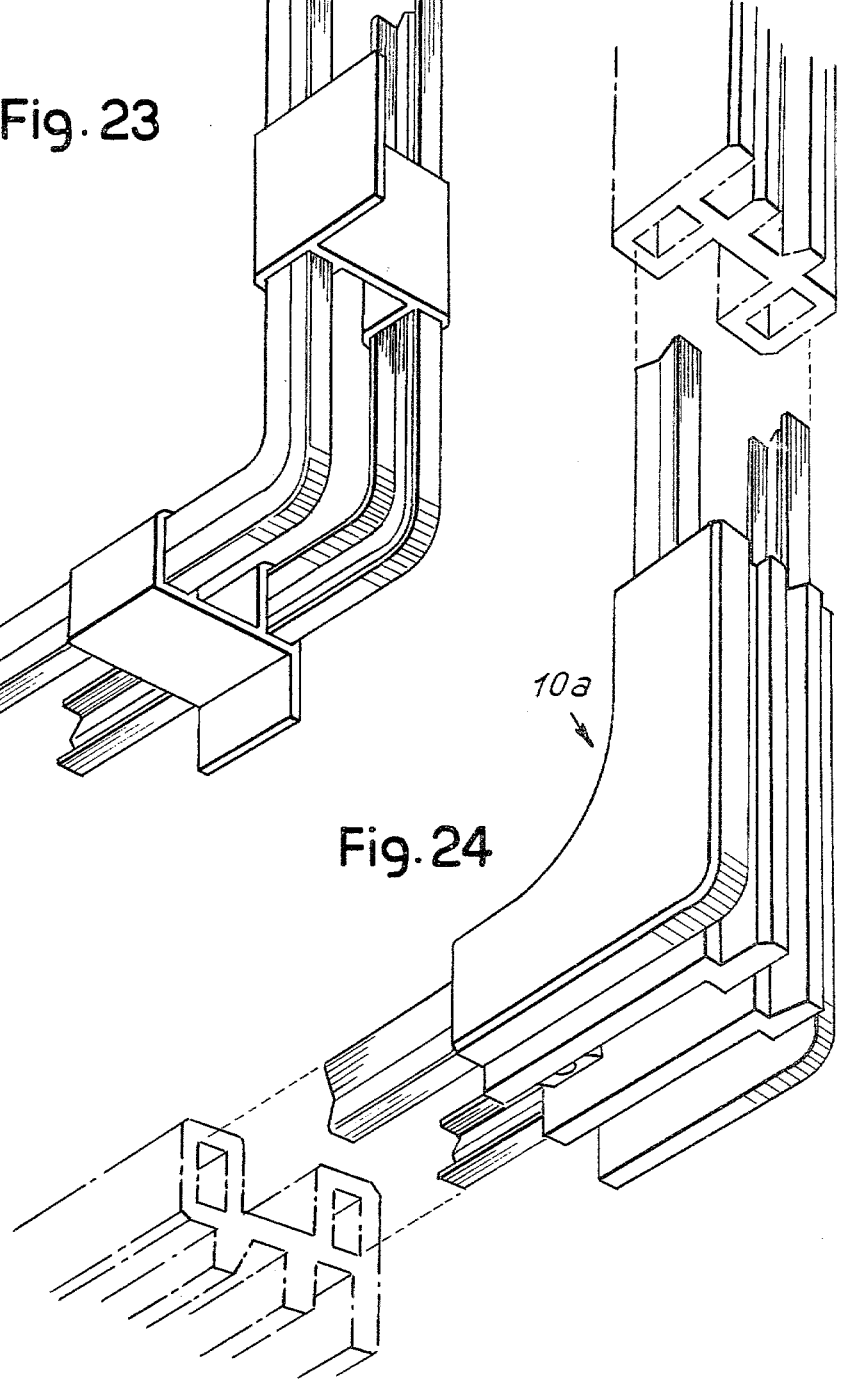

In FIG. 3 besides the sash with one wing, a sash is shown having two wings with the angular elements of one of the wings, corresponding exactly to those of the single wing sash; the other of the two wings (on the right hand side looking at FIG. 3 of the drawing) includes angular elements 3a and 4a which are substantially symmetrical with respect to the ones 1a and 2a and thus are not particularly illustrated. Two angular elements 9a and 10a are illustrated in FIGS. 21 and 22 and respectively in FIGS. 23 and 24. The angular elements of the stationary frame are the two elements 1b and 2b, already described, and the elements 3b and 4b, which are substantially specularly symmetrical with respect to those denoted by 1b and 2b and thus are not particularly illustrated.

With the transversally sheared lengths of the sections illustrated and with the described angular elements, similar to those described, it is possible to set up sashes of the shapes and dimensions desired, by a simple fixing-in and with possible forced anchoring or with plug means or the like, of the metal squares 22, 24 and 82, 84 which project from the angular bodies moulded thereon. The stresses are discharged or released from the hinges directly onto the angular elements and thus the uprights in correspondence of the hinges are not particularly stressed and above all are not worked. Also other components required for the functionality of the sash do not require particular working. In particular, the uprights and of the other components, because of what is required is already practically provided in the moulding operation and only simple working may be requested in the uprights for the application, for instance in the operative devices of the locks and the like. There are already provided the selvages and housings for the cremone bolts, the engaging housings for the ends of the cremone bolts on the stationary frames and the like.

In particular, provisions are also made—as is shown in FIG. 14 and in FIGS. 28 and following for instance—for the application of a particular component 50 which serves to make the frames of the movable wings cooperate also with the glass panes which are inserted in the wing frame to stiffen the frame with the aid of the pane and to make the glass immovable like the frame of the movable wing.

The piece 50 which is provided at an end of the horizontal upper side of the movable wing serves to adjust the assembly of the wing frame and plane L, in order to allow the exact adjustment and setup. In particular, one of the angular elements of the frame of the movable wing denoted by 150 in FIG. 28, which defines the lower corner of the hinged side with the hinges denoted generally 152, forms a pair of bearings 150A and 150B which are substantially contiguous and in relation to the pane L represent a hinge bond. The vertical side opposite the one of the hinges 152 has in the frame of the wing, a bearing 154 formed by the angular element 155, in the upper portion, adjacent to built-in piece 50 which co-acts with the pane (in the hereinafter described manner) adjacent the angle or corner of the pane L, which is diagonally opposite the one cooperating with the bearings 150A and 150B. The corner L2 of the pane substantially cooperates with the hinge practically formed by the bearings 150A and 150B, while the diagonally opposite angle or corner L1 cooperates with the stationary bearing 154 and with the adjusting device 50.

This adjustment device 50 is applied in correspondence of the gap between the two portions 35 and 36 of the section which forms the upper side of the frame of the movable wing including the pane L. The two portions 35 and 36 define a slot 156 which is designed for the insertion of the glass pane, and the upper side of the frame being completed by the section 38, which is inserted above the slot 156, being engaged in longitudinal recesses of the two sections 35 and 36. The device 50 is inserted after the insertion of the glass and before the application of the section 38. The device 50 is more particularly engaged with lengths of sections 35B and 36B similar to those denoted by 35A and 36A and incorporated in the corner 155.

The device 50 includes a cross-beam 501 developed with a U cross-section and extended at the ends by two rectangular fins 503; these fins 503 can be fixed into a corresponding housing 505 made up in the same member 155 which forms the bearing 154 and is engaged to the double upper horizontal cross-beam 35, 36 combined subsequently to the joint cover 38. The fixing arrangement of the fins 503 is such, whereby the cross-beam 501 is slightly abutting from the housings 505 and accessible from the slot 156 when this is still uncovered, that is before applying the joint cover section 38. In particular, with reference to FIGS. 14, 29, 30, an angular element 155 is developed like the moulded body 40 of the angular component 5a of the preceding scheme, in which element a pair of sections 155A, 155B is formed in which a length of the section 35B, 36B is incorporated substantially corresponding to the metal cores 35A and 36A of the sections 35 and 36 forming the upper slot cross-beam of the frame of the movable wing as above described, with the difference that the lengths 35B and 36B form, on the juxtaposed sides along the slot 156, sliding and housing for the fins 503. The lengths 35B and 36B incorporated in the bodies 28 and 40 (elements 5a, 9a) form fixing housings or seats for the device 50. The bodies 28 and 40 are moulded with cavities designed to allow the insertion in the vertical direction, that is, according to the arrow f1 of the device 50, and then is moved according to the arrow f2 for the fixing insertion of the fins 503 in the housings 505. After the insertion of the device 50 into its fixing seats for the fins 503, the device has the cross-beam 501 accessible for operating a threaded pin 510, whose inner end is engaged, mostly with a bond that allows the rotation, with a pad 512 in contact with the pane L, and in particular the edge of the pane L which is horizontal and adjacent the angle L1. By operating the threaded stem 510, it is possible to move the pad 512 from the position shown in FIGS. 31 and 32 with a full line into the position indicated by a dotted line 512X in FIG. 32. In this way, and with a fine adjustment of the position of the pad 512, it is possible to adjust the array of the frame with reference to the pane L, so that the pane may affect the stiffening of the assembly of the movable wing.

In fact assuming in particular the case of FIG. 28 and taking into account that the bond of the angle L2 with the bearings 150A, 150B, may be considered a hinge, the elements of the wing frame aremovable with respect to the angle or corner L2 in the angular direction. Considering the bearing 154 as a sliding bearing with respect to the vertical side of the pane L adjacent the angle L1, it is to be noted that the bearing of the frame on the pane is obtained by means of the pad 512 which is adjustable.

Therefore, the slight deformation or strains that can be imposed onto the frame of the wing are controlled by the adjustment of the pad 512 with respect to the pane to be considered as indeformable. Adjusting the threaded stem 510, allows one to determine a lifting or lowering movement of the side of the frame which carries the bearing 154 according to the double arrow f3, allowing the adjustment of the angular array of the linked quadrilateral in which the frame of the wing may be considered formed. The stiffening of this frame is determined by the pane L through the bearings 150A, 150B, 154 and 512, this latter being adjustable. Therefore, one obtains a correct adjustment of the frame and a direct response of the pane or panel of the movable wing of the stiffening of the entire assembly.

Many modifications and variations of the present invention are possible in light of the above teachings. It is, therefore, to be understood that within the scope of the appended claims, the invention may be practiced otherwise than as particularly described.

For instance, provisions may be made for another development of the expanded portions at the corners of the angular elements connecting the uprights, like extended plates according to the diametral plane; in this case there is no same length and no transversal cutting of the sections.

I claim:

1. A sash apparatus structure, including: an outer stationary frame and a movable frame hinged thereto; angular connection means defined by connection elements engaged with respective side portions of said outer and movable frames, said frames being integrally provided with means to cooperate in the operation of said apparatus, having hinge means and guide selvage of closure latch means; side means forming side sections of the outer and movable frames respectively of said apparatus, said angular connection means being formed of a series of corner branch elements inserted in associated side sections of said frames to complete said corner of said apparatus; all said frame side sections being equal in said outer frame and said movable frame. The respective outer frame and movable frame corner branch elements being formed with expansion means having respective end surfaces which are substantially co-planar.

2. A sash structure as claimed in claim 1, wherein: said connection elements being formed of pairs of flanked square members integrally formed by means of expansion means including connecting stirrups.

3. A sash structure as claimed in claim 1, wherein: adjustment means are provided at an end at an upper side portion of said movable frame for fixedly positioning said frame when a glass pane is inserted therein.

4. A sash structure as claimed in claim 3, wherein: an angular connection element being formed at a lower portion thereof by a pair of angular bearing means contiguous with said glass pane; sliding bearing means formed in an upper portion of said movable frame in proximity to said adjustment means and being diagonally opposite to one of said angular bearing means, serving to cooperate with said adjustment means to positively position said pane.

5. A sash structure as claimed in claim 4, wherein: adjustable bearing means defined by a pad is provided between said frame and a vertical surface of said pane.

* * * * *